United States Patent [19]

Chang et al.

[11] 3,821,726

[45] June 28, 1974

[54] BLOW-OUT SENSOR

[75] Inventors: Nuke Ming Chang, San Francisco; I. J. Flowers, Yorba Linda; Gordon M. Anderson, Fullerton, all of Calif.

[73] Assignee: Santa Fe International Corporation, Orange, Calif.

[22] Filed: May 8, 1972

[21] Appl. No.: 250,919

[52] U.S. Cl. ............. 340/239 R, 73/155, 73/194 B, 175/48
[51] Int. Cl. ........................................ G08b 21/00
[58] Field of Search ....... 340/239 R; 73/155, 194 B, 73/194 E; 166/250; 175/40, 48

[56] References Cited
UNITED STATES PATENTS

| | | |
|---|---|---|
| 3,258,763 | 6/1966 | Klein .............................. 340/380 X |
| 3,580,092 | 5/1971 | Scarpa ........................... 340/239 R |
| 3,602,322 | 8/1971 | Gorsuch ......................... 340/239 R |
| 3,646,808 | 3/1972 | Leonard ............................. 73/155 |

*Primary Examiner*—John W. Caldwell
*Assistant Examiner*—Daniel Myer
*Attorney, Agent, or Firm*—LeBlanc & Shur

[57] ABSTRACT

A device for sensing an impending blowout or so-called "kick" in an oil well. A vibration detector is attached to the drilling fluid supply and return pipes to sense the amount of flow through them. The volume flow of drilling fluid (mud) through the pipes is directly proportional to the power level of the electrical signal at ultrasonic frequencies above about 20KHz. An excessive increase or decrease in flow through either pipe is used to indicate the likelihood of a "kick."

8 Claims, 4 Drawing Figures

BLOW-OUT SENSOR

This invention is directed to a device for sensing an impending blowout or so-called "kick" in the borehole of an oil well and more particularly is directed to an ultrasonic vibration sensor which in no way adversely affects or otherwise modifies the flow through a pipe to which the sensor is attached.

So-called "kick" detectors for detecting a possible or impending borehole blowout are well known. In some instances these detectors have included devices for detecting the return rate of the drilling fluid or "mud" pumped through the well bore. However, insofar as applicants are aware, all these devices have suffered serious disadvantages in that they have introduced a substantial pressure drop into the mud return pipe or have been subjected to excessive contamination, corrosion or abrasive wear.

The present invention avoids these disadvantages by providing a device for detecting the rate of flow of the drilling fluid by detecting the magnitude of ultrasonic frequencies emanating from the inlet and outlet flow pipes as the drilling fluid circulates through the well bore. These ultrasonic frequency vibrations are generated in the pipe by the flow of mud with an output which is a function of flow velocity. It has been found that the volume flow of mud through the pipes is directly proportional to the power level of the received signal at ultrasonic frequencies above about 20KHz. By sensing the magnitude of the signal at these frequencies, it is possible to determine the volume flow of mud through the pipes and in this way sense a "kick" or impending blowout prior to its reaching the critical stage and without in any way affecting the flowpath for the mud through the pipes.

During oil well drilling a drilling fluid or so-called "mud" is circulated through the borehole to prevent material from entering it through the borehole walls. Formation pressure at every depth is balanced or slightly over-balanced by hydrostatic pressure of the drilling fluid in the borehole. In this way whatever is trapped in the rocks, be it solid, liquid or gas, is kept out of the borehole. A kick develops whenever the formation pressure becomes such as to overbalance the opposing hydrostatic head. Whatever has been trapped in the rock formation is then free to move into the borehole. Detecting the borehole invasion can be made by monitoring mud returns at the surface, total pit volume and mud weight. When these variables stray from normal values a quick reaction will normally prevent a full-scale blowout.

The rate of return from the well bore is normally the first positive surface indication that a borehole invasion of formation fluid exists. Whenever flow rate from the well bore exceeds flow rate into the well bore problems are imminent. Likewise, a decrease in mud return without a corresponding decrease in mud pump volume indicates a loss of circulation which also could result in a "kick."

A "kick" in the well bore may be generated in a variety of ways. For example, a kick may be created if the density of the drilling fluid or drilling mud is too low. Failure to keep the hole adequately filled with drilling fluid also can result in a kick and this condition may often be created during trips. Reduction of hydrostatic pressure by pipe withdrawal, sometimes called "swabbing" the hole may result in a kick. Reduction of hydrostatic pressure through loss of drilling fluid into the formation, i.e., loss of circulation, is another cause as are those situations which result from drilling into abnormally pressured permeable zones in the rock formation.

Formation fluid enters the borehole at a rate determined by permeability of the rock, length of the permeable interval exposed and the formation-to-borehole pressure differential. As the kick fluid moves up through the mud column minute gas bubbles expand as they rise. Expanding bubbles contaminate a large section of the mud column, further reducing the hydrostatic head and allowing more rapid entry of more formation fluids. If unchecked, the inrushing formation fluids expel mud from the hole, reducing hydrostatic head to virtually nil. There is nothing to hold back the formation fluids, and a full-scale blowout is the result.

In the present invention piezoelectric vibration sensors are preferably attached to both the mud outlet pipe through which flows the mud returning from the borehole and to the inlet pipe supplying mud to the borehole from the surface pump. Electrical signals from the vibration transducers are preferably supplied by shielded cables to a remote monitor which monitors both the flow of drilling fluid or mud into the borehole and the return flow from the borehole. In the monitor the electrical signals are amplified and passed through a filter so that only selected ultrasonic frequencies are passed, i.e., those between about 20 and 40KHz. The ultrasonic frequency signals are then rectified and applied to comparators which control the outputs to a plurality of indicator lights. In the preferred embodiment there is a green light for each flow pipe which is illuminated to indicate normal flow, a red light for each flow pipe to indicate an above-normal quantity of flow through each pipe, and an amber or yellow light to indicate below-normal flow. The comparator outputs are connected through optical couplers for 60-cycle isolation to a plurality of solid state switches such as triacs, which selectively energize the indicator lights or bulbs.

As previously stated, the first positive indication at the surface of a kick is usually an increase in the return flow rate of fluid without a corresponding increase in the input flow rate to the borehole. This is immediately indicated by the monitor so that the operator at the surface of the well has an intermediate indication of the change in the flow rate. Similarly, an abnormal drop in the return flow rate from the well if not accompanied by a corresponding drop in the flow rate from the pump is an indication of loss of circulation which may also result in a kick and this, too, is indicated on the monitor so that the operator at the surface may take appropriate action to prevent the kick from developing into a full-scale blowout.

It is therefore one object of the present invention to provide an improved blowout sensor for sensing kicks or impending blowouts in the borehole of a well.

Another object of the present invention is to provide a blow-out sensor which utilizes ultrasonic frequencies to sense the flow rate in one or both of the mud return and of mud inlet pipes of a well.

Another object of the present invention is to provide an improved ultrasonic vibration detector and monitor for monitoring drilling fluid flow rate through a well borehole.

Another object of the present invention is to provide an improved flow rate monitor in which the volume flow is proportional to the power level of selected ultrasonic frequency vibrations emanating from a flow pipe.

Another object of the present invention is to provide an improved borehole mud flow monitoring system incorporating piezoelectric vibration sensors attached to drilling fluid flow pipes.

Another object of the present invention is to provide a flow sensing monitor in which the sensing elements are external to the pipes through which the fluid flows so that the sensors introduce no pressure drop into the flow pipes and are not subject to either contamination, corrosion or abrasive wear.

Another object of the present invention is to provide an improved method for monitoring the flow rate of drilling mud either into, or out of a borehole, or both.

These and further objects and advantages of the invention will be more apparent upon reference to the following specification, claims and appended drawings therein.

Figure 1:
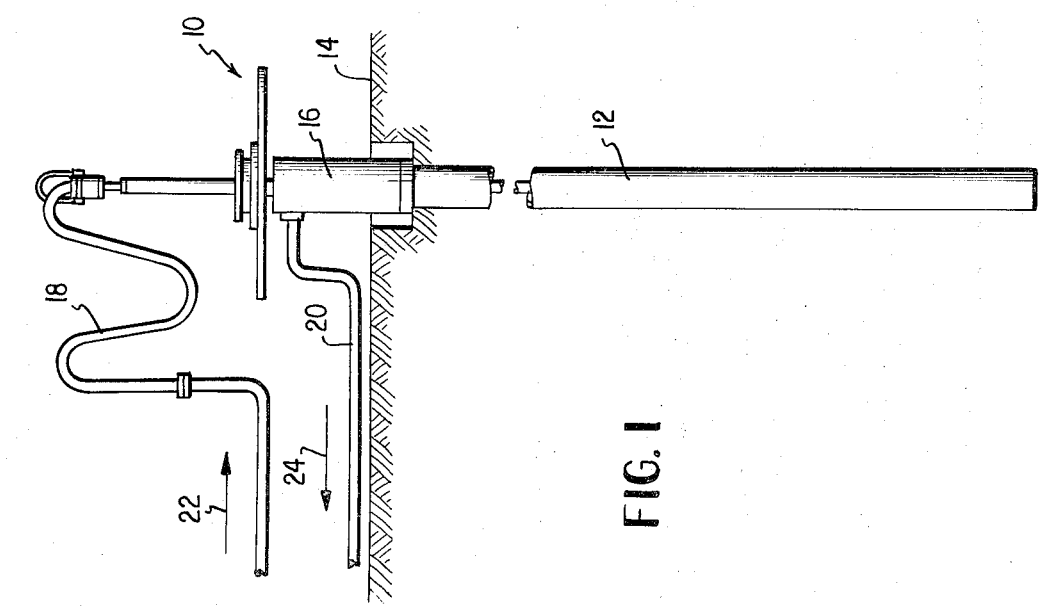
FIG. 1 is a simplified schematic showing of a typical drilling rig for an oil well with the drilling fluid or mud supply and return lines.

Referring to the drawings, FIG. 1 illustrates a drilling rig generally indicated at 10 as extending into a well bore 12 from the ground level indicated at 14. The rig includes a casing generally indicated at 16 to which is connected a drilling fluid or mud supply line at 18 and a mud return line 20. It is understood that the mud is supplied through line 18 in the direction of the arrow 22 from a suitable pump (not shown) and is returned to the mud pit (not shown) in the direction of the arrow 24 from the well bore through line 20.

Figure 2:
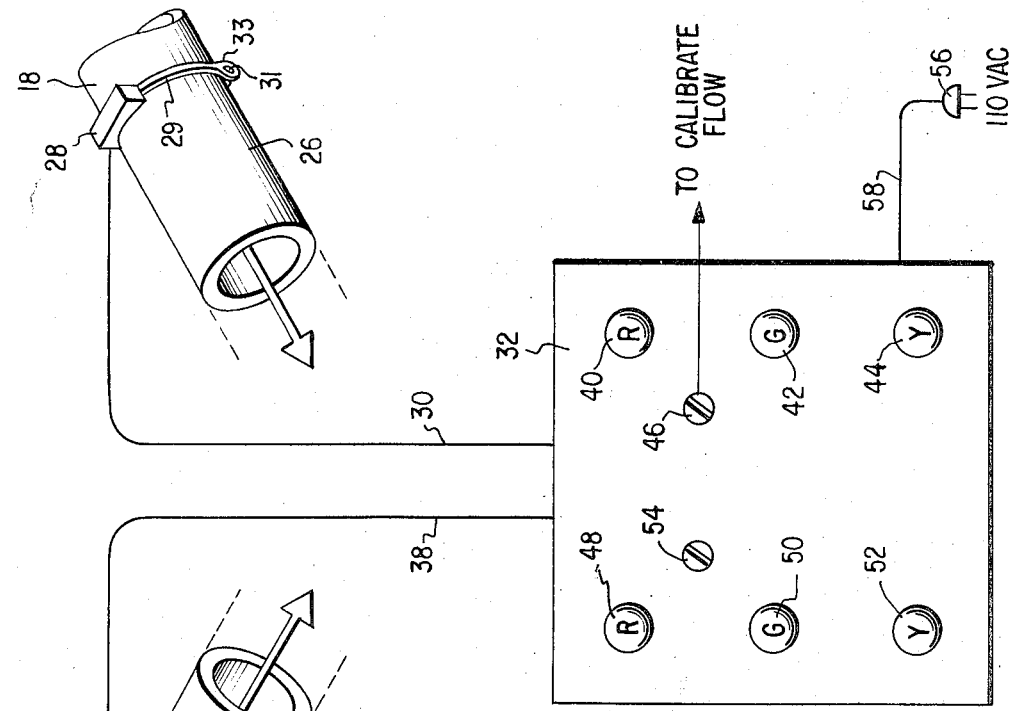
FIG. 2 is a front view of a drilling fluid monitor constructed in accordance with the present invention, electrically connected to sensors mounted on the pipes forming the mud supply and return lines of FIG. 1.

FIG. 2 shows the supply line 18 as including a section of conventional metallic pipe 26 to which is attached a vibration piezoelectric sensor 28. This sensor is connected by a suitable electrical line 30, preferably in the form of a shielded co-axial cable to a remote flow monitor 32. By way of example only line 30 may be approximately 15 feet long to make sure that the monitor is sufficiently spaced from sensor 28 and from the pump supplying fluid through pipe 26. Return line 20 is illustrated in FIG. 2 as including a section 34 of similar conventional metal pipe to which is attached a second piezoelectric vibration sensor 36. This sensor is connected by a similar preferably shielded cable 38 to a second input of the monitor 32.

Transducers 28 and 36 are mounted externally of pipes 18 and 20 so that they in no way interrupt the flow of mud through the pipes and are not in contact with the flowing mud or subject to the abrasive wear which would result from direct contact with the flowing material. The transducers may be attached to the pipes in any suitable manner and are illustrated as provided with flexible metal straps 29 and 35 which extend around the pipe. The straps are clamped to the pipes by bolts 31 threaded through ears 33 on the straps so that when the bolts are tightened adjacent strap ears are urged together, the straps tightly engage around the circumference of the pipes and the transducers are securely clamped in place on the outer surface of the pipes. By loosening the bolts the clamp ears may be separated and the transducers adjusted in position or completely removed from the pipes.

Monitor 32 is formed in two sections or two halves of identical construction, one for the supply pipe 26 including a red indicator light 40, a green indicator light 42, a yellow indicator light 44 and a calibration screw 46. The other half or section of the monitor includes a red indicator light 48 for the return pipe 34, a green indicator light 50, and a yellow indicator light 52, as well as a return flow calibration adjust screw 54. The monitor is provided with conventional 110 volt 60 Hz power by way of plug 56 and a cord 58. While shown as adapted for AC operation it is understood that, if desired, monitor 32 may be battery operated.

Figure 3:
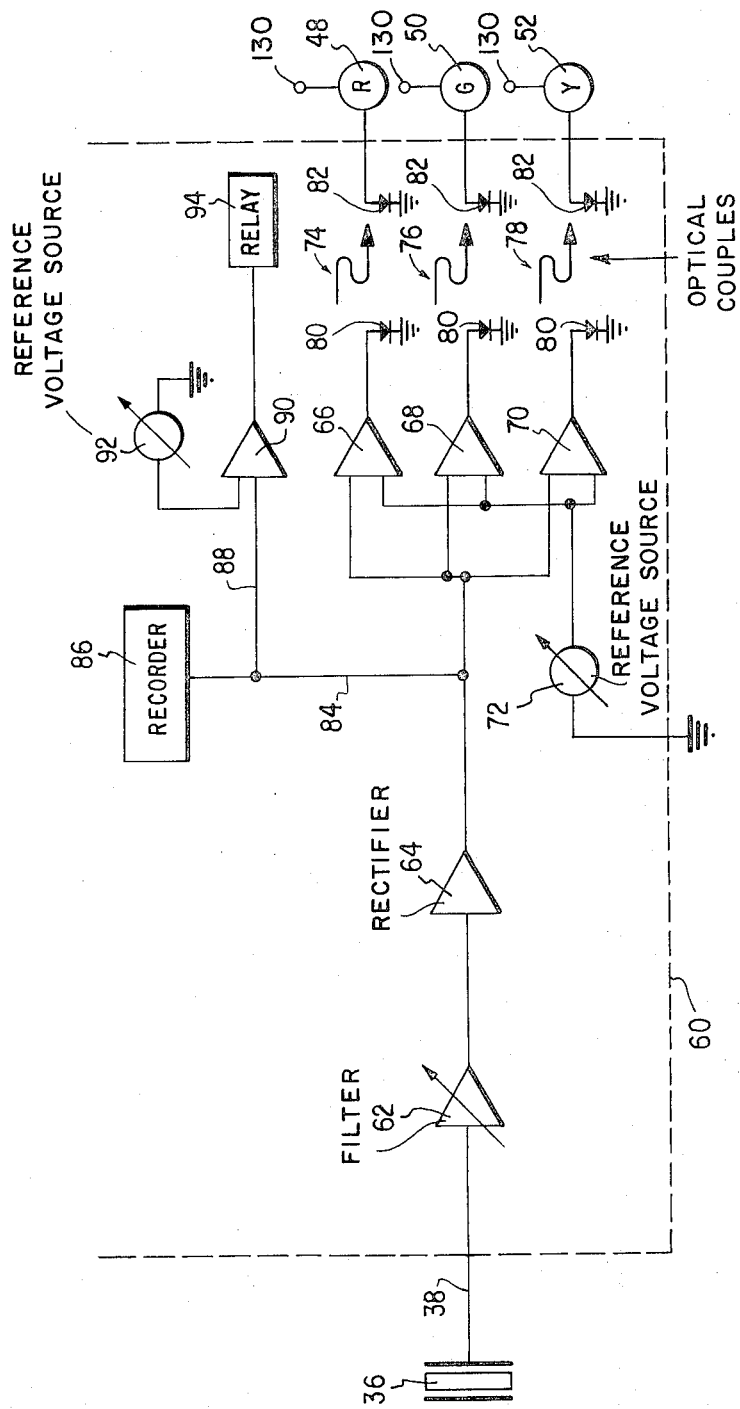
FIG. 3 is a simplified block diagram of half of the electrical circuit for the monitor of FIG. 2.

FIG. 3 is a simplified block diagram of a portion of monitor 32 of FIG. 2. Only the circuitry for half the monitor is illustrated in FIG. 3 for the sake of clarity, it being understood that the other half of the monitor circuit is of identical construction. In particular, FIG. 3 illustrates the circuitry for the return line 20, it being understood that the circuitry in the other half of the monitor for the feed line 18 of FIG. 2 is of identical construction. Transducer 36 in FIG. 3 is illustrated as connected by a shielded cable 38 to the monitor which is preferably also shielded as indicated by the dash line 60. The vibrations sensed by transducer 36 appear as electrical signals on cable 38 and are fed by way of the cable to a variable filter 62. Filter 62 is preferably of the band pass type and in the preferred embodiment passes frequencies in the ultrasonic range, i.e., from about 20KHz to about 40KHz. The frequencies of particular interest passed by the filter 62 are those lying in the neighborhood of about 30KHz. From the filter the AC electrical signals pass to a full wave rectifier 64 where the AC signals are converted into DC. The DC signals from the rectifier are applied to one input of the three comparators 66, 68 and 70, which compare the voltage level output from the rectifier with reference potentials applied to the other inputs of each of the comparators from a variable reference voltage source 72. Each of the comparators is connected through an optical coupler 74, 76 and 78 to a corresponding one of the lamps 48, 50 and 52. Each of the optical couplers is of identical construction and comprises a photoemitter 80, such as a light-emitting diode and a photodetector or photo sensor 82, for receiving the radiation from its corresponding light-emitting diode.

Preferably the DC output from rectifier 64 is also applied by way of a lead 84 to a strip chart recorder 86. This recorder preferably includes a pair of styli, one for each side of the monitor 32 so that a permanent pen recording is made of the flow of mud through both the input and outlet pipes by the recorder 86. Also, in the preferred embodiment the DC output from rectifier 64 is applied by lead 84 and a second lead 88 to one input of a fourth comparator 90. The other input of this comparator is connected to a reference voltage source 92 which is illustrated separately in FIG. 3, but which may be combined with the reference voltage source 72 previously described. Comparator 90 is provided to sense gross excursions in the flow rate such as a very large increase or decrease in the return flow. When a very large change in flow rate is sensed the output of comparator 90 changes state to actuate a relay 94 forming an emergency shut-down relay to suspend operation of the pumping system, to actuate necessary valves and if desired provide other indications that immediate and extreme corrective action must be taken to avoid a blowout.

Figure 4:
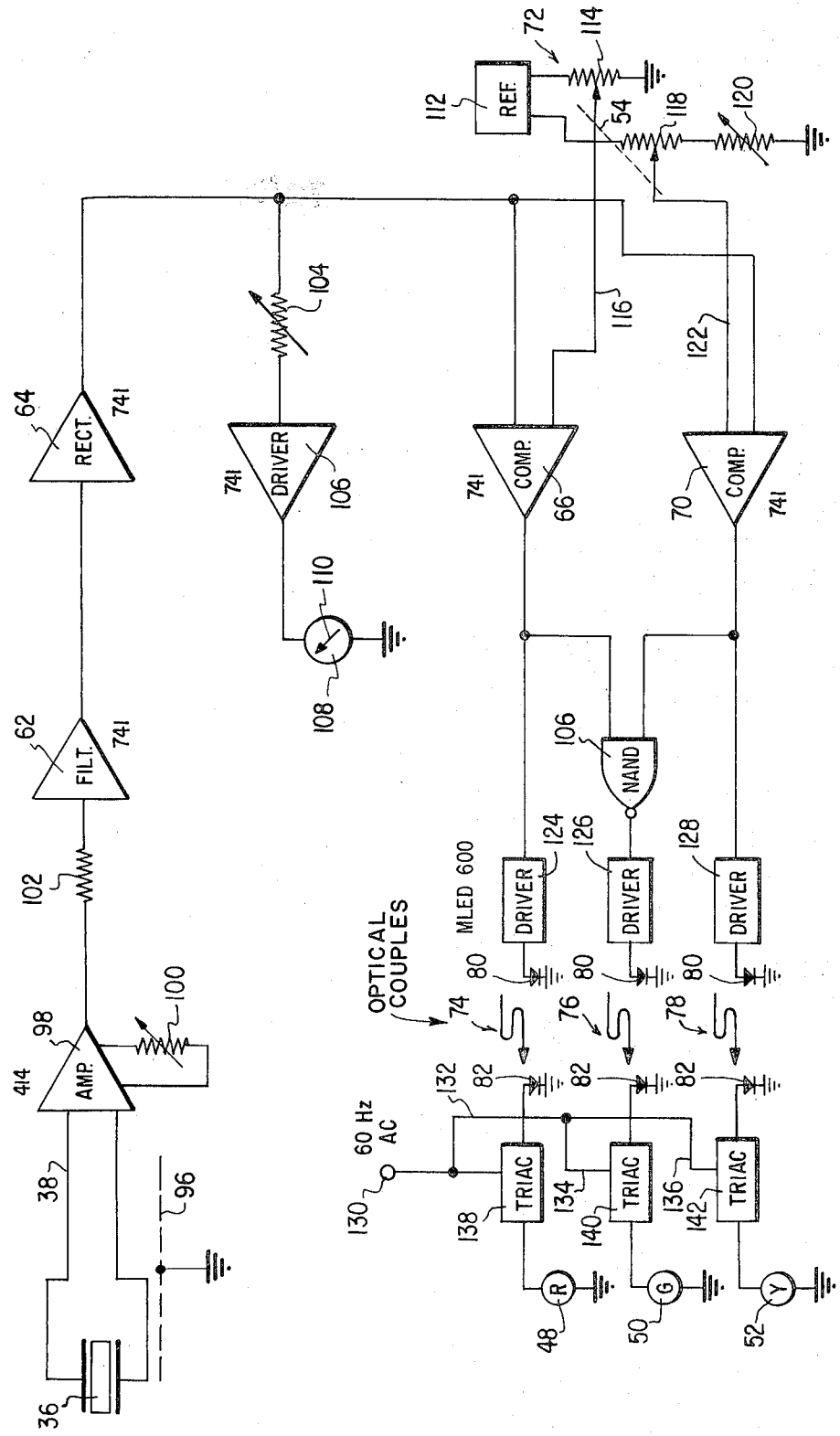
FIG. 4 is a detailed block diagram of a portion of the monitor of FIGS. 2 and 3.

FIG. 4 is a more detailed block diagram of a portion of the monitor of FIGS. 2 and 3 and like parts in FIG. 4 bear like reference numerals. Referring to FIG. 4 transducer 36 is connected by cable 38 which is preferably of the shielded type as indicated by dash line at 96 to an instrument amplifier and buffer 98. As previously indicated shielded cable 38 extends preferably for a minimum distance of about 15 feet to adequately shield the monitor from the vibrating sensor or transducer and from the system pump. Connected to amplifier 98 is a variable resistor 100 which acts as a gain adjustment resistor for adjusting the overall gain of the system. AC signals at the output of amplifier 98 are connected through a coupling resistor 102 to the input of filter 62. From filter 62 the pass signals which preferably lie in the range from about 20KHz to about 40KHz enter a full wave rectifier 64. Filter 62 and rectifier 64 are preferably formed from conventional integrated circuits such as the 741. The full wave rectified or DC output potential from rectifier 64 is preferably supplied through a variable coupling resistor 104 to a meter driver 106. Meter gain may be varied by adjusting a variable resistor 104 and the output of driver 106 is connected to a meter 108. Meter 108 is provided with movable pointer 110 which moves from zero to full scale to indicate between zero and 100 percent flow. Meter 108 is preferably in the form of a conventional DC volt meter and senses the magnitude of the voltage output from driver 106.

In the preferred embodiment illustrated in FIG. 4, the output from rectifier 64 is also applied to one input of the two comparators 66 and 70 and the third comparator is replaced by a logic circuit including a NAND gate 106. One input of high level comparator 66 is connected to the output of the rectifier and the other input of the comparator is connected to the reference voltage source circuit generally indicated at 72 in FIG. 4. This circuit includes a reference voltage generator 112, preferably including a zener diode circuit to provide a closely regulated DC voltage output. The DC voltage output from generator 112 is supplied to a high-level potentiometer 114 and the wiper arm of this potentiometer is connected by lead 116 to the other input of high-level comparator 66. The output from generator 102 is also applied to a low-level potentiometer 118. If desired one or both potentiometers may be connected in series with a variable resistor such as shown at 120. This latter resistor provides a course or approximately 20 percent adjustment for the reference voltage level of the comparator. The wiper of potentiometer 118 providing fine adjustment of the low-level reference potential is connected by way of lead 122 to the other input of comparator 70. The wiper arms of potentiometers 114 and 118 are preferably ganged as indicated by the dash line in FIG. 4 and these wiper arms are moved in unison by adjustment of calibration screw 54 of FIG. 2.

Connected to the output of comparator 66 is a light-emitting diode driver 124 and similar drivers 126 and 128 are connected to the output of NAND gate 106 and to the output of low-level comparator 70. These drivers feed the optical couplers 74, 76 and 78 which are provided to give 60Hz isolation from a conventional 60Hz power terminal 130. This terminal 130, which by way of example only be connected to a conventional 120 volt AC outlet, supplies power by way of leads 132, 134 and 136 to three solid state switches 138, 140, and 142 preferably in the form of triacs. The other side of each triac is connected to the respective red, green and yellow indicator lamps 48, 50 and 52 so that when the appropriate optical coupler is energized the corresponding triac completes the power circuit from terminal 130 through the appropriate one of the lamps 48, 50 and 52.

In operation, adjustment screw 54 is rotated moving the wipers of potentiometer 114 and 118 so that a suitable DC reference potential is applied from potentiometer 114 to one input of comparator 66. When the DC signal level from rectifier 64 at the other input to comparator 66 exceeds the potential from lead 116 the output of comparator 66 goes to a potential of plus 15 volts activating driver 124 and turning on the red lamp 38 to indicate a high level of flow. A similar reference potential is applied from the wiper of potentiometer 118 by lead 122 to one input of comparator 70. When the DC signal potential falls below the potential on lead 122 this lower potential at the other input to comparator 70 causes the output of comparator 70 to assume a positive potential of 15 volts activating driver 128 and turning on the yellow indicator light 52 to indicate a below-normal flow of drilling fluid through the pipe. By way of example only, potentiometer 114 may be selected and adjusted to activate the high-flow lamp 48 when the flow goes approximately 10 percent above normal. Similarly, potentiometer 118 and resistor 120 may be adjusted so that driver 128 is actuated and yellow lamp 52 energized when the output from rectifier 64 indicates a flow more than about 6 percent below normal flow.

During normal flow the voltage level output from rectifier 64 is below the potential on lead 116 to comparator 66 but above the potential on lead 122 to the comparator 70. In this situation during normal flow, the outputs of comparators 66 and 70 are both at minus 15 volts so that the two inputs to NAND gate 106 are negative and the NAND gate produces a positive output actuating the driver 126 and energizing green indicator light 50 to indicate a normal flow within the range from about 10 percent above normal to about 6 percent below normal flow. At the same time meter 18 gives an absolute indication of the amount of flow through the pipe.

It is apparent from the above that the present invention provides an improved blow-out sensor for preventing blowout during well drilling operations. Important features of the present invention include the provision of piezoelectric transducers connected externally to one or both of the supply and return mud pipes for sensing flow through the pipes. By means of this external connection, the flow sensors introduce no pressure drop in the pipe and since they are completely external they are not subject to the corrosion and wear of previous constructions. The pressure variations or sound vibrations emanating from the pipes are sensed by the piezoelectric pressure transducers and are converted into electrical signals. Certain ultrasonic frequencies, preferably in the neighborhood of 30KHz, are passed through a suitable bandpass filter and a full wave rectifier and the magnitude of the resulting voltage corresponding to the signal magnitudes at these frequencies is used to actuate indicator lights to give immediate indications of any changes which may occur in the flow of mud through the pipes. By way of example only, the transducers may be of the type incorporating a Clevite PZT-5 piezoelectric ceramic material with a resonant frequency of about 300KHz so that the transducers are substantially linear over the range of frequencies to be detected. Amplifier 98 is preferably an integrated circuit amplifier identified as Luchter No. 414 and is an operational amplifier acting as an instrument amplifier and buffer to give common mode noise rejection. Filter 62 is formed of a 741 integrated circuit having an adjustable center frequency and adjustable Q to pass frequencies in the 20–40 KHz range and particularly those around 30KHz and above. Full wave rectifier 64 is a 741 integrated circuit as is the meter driver 106. Comparators 66 and 70 are also preferably 741 integrated circuits, while the drivers 124, 126 and 128 may be the type manufactured by the Motorola Company identified as MLED 600. The circuit figure may be used with a conventional 68 AC power supply providing a plus and minus 15 volt output identified as Luchter power supply 136 and a regulated DC source for the set point potentiometers 114 and 118 identified as Luchter 200P reference voltage source.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A blow-out sensor comprising first and second piezoelectric transducers for attachment to the outside of respective drilling fluid supply and return lines, a remote monitor including high and low indicators for each of said lines for indicating variations above and below normal flow of drilling fluid through each line, and an electrical cable coupling each of said piezoelectric transducers to said remote monitor, said monitor comprising for each of said transducers a filter coupled to a corresponding one of said cables for passing signals from said corresponding transducer in the ultrasonic frequency range, a rectifier coupled to the output of said filter, and a plurality of voltage comparators coupling said rectifier to said indicators for selectively energizing one of said indicators in response to the output of said rectifier.

2. A blow-out sensor according to claim 1 wherein said filter passes signals from said transducer having a frequency above about 20 KHz.

3. A blow-out sensor according to claim 2 wherein said filter passes signals from said transducer having a frequency in the range of about 20 to 40 KHz.

4. A blow-out sensor according to claim 3 wherein said filter passes signals from said transducer of about 30 KHz.

5. A blow-out sensor according to claim 1 including an electrical meter coupled to the output of said rectifier for indicating flow through said pipe.

6. A blow-out sensor according to claim 1 wherein said indicators comprise lamps and further including a pair of power supply terminals, a solid state switch coupling each of said indicator lamps between said power supply terminals, and optical couplers connected between said comparators and each of said solid state switches.

7. A blow-out sensor according to claim 1 wherein said remote monitor includes a strip chart recorder coupled to the output of said rectifier.

8. A blow-out sensor according to claim 1 including a shut-down relay, and means connected in said monitor and responsive to the ultrasonic frequency signals for actuating said relay.

* * * * *